United States Patent
Kim et al.

(10) Patent No.: US 9,147,249 B2
(45) Date of Patent: Sep. 29, 2015

(54) APPARATUS AND METHOD FOR CALIBRATING DEPTH IMAGE BASED ON RELATIONSHIP BETWEEN DEPTH SENSOR AND COLOR CAMERA

(71) Applicant: ELECTRONICS AND TELECOMMUNICATIONS RESEARCH INSTITUTE, Daejeon (KR)

(72) Inventors: Jae Hean Kim, Yongin-si (KR); Chang Woo Chu, Daejeon (KR); Il Kyu Park, Daejeon (KR); Young Mi Cha, Busan (KR); Jin Sung Choi, Daejeon (KR); Bon Ki Koo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 31 days.

(21) Appl. No.: 14/059,685

(22) Filed: Oct. 22, 2013

(65) Prior Publication Data

US 2014/0112574 A1  Apr. 24, 2014

(30) Foreign Application Priority Data

Oct. 23, 2012  (KR) .......................... 10-2012-0117997
Sep. 3, 2013  (KR) .......................... 10-2013-0105538

(51) Int. Cl.
*G06K 9/00* (2006.01)
*G06T 7/00* (2006.01)

(52) U.S. Cl.
CPC ..... *G06T 7/0018* (2013.01); *G06T 2207/10004* (2013.01); *G06T 2207/10028* (2013.01); *G06T 2207/30208* (2013.01)

(58) Field of Classification Search
CPC .................. G06T 7/002; G06T 7/0018; G06T 2207/30208; G06T 2207/10028; G06T 2207/10004
See application file for complete search history.

(56) References Cited

U.S. PATENT DOCUMENTS

2011/0211749 A1*  9/2011  Tan et al. ...................... 382/154
2012/0105585 A1  5/2012  Masalkar et al.

OTHER PUBLICATIONS

"Kinect Camera Calibration," Story of Programming, Mar. 12, 2011, Retrieved Nov. 19, 2012 from http://anybody-has-a-blog.tistory.com/142 (17 pages, in Korean, with complete English translation).
Lee et al., "The Estimation of Hand Pose Based on Mean-Shift Tracking Using the Fusion of Color and Depth Information for Marker-less Augmented Reality," Journal of the Korea Society of Computer and Information, vol. 17, No. 7, Jul. 2012 (12 pages, in Korean).

* cited by examiner

*Primary Examiner* — Brian Le
(74) *Attorney, Agent, or Firm* — NSIP Law

(57) ABSTRACT

Disclosed is a method of calibrating a depth image based on a relationship between a depth sensor and a color camera, and an apparatus for calibrating a depth image may include a three-dimensional (3D) point determiner to determine a 3D point of a camera image and a 3D point of a depth image simultaneously captured with the camera image, a calibration information determiner to determine calibration information for calibrating an error of a depth image captured by the depth sensor and a geometric information between the depth sensor and a color camera, using the 3D point of the camera image and the 3D point of the depth image, and a depth image calibrator to calibrate the depth image based on the calibration information and the 3D point of the depth image.

16 Claims, 7 Drawing Sheets

APPARATUS AND METHOD FOR CALIBRATING DEPTH IMAGE BASED ON RELATIONSHIP BETWEEN DEPTH SENSOR AND COLOR CAMERA

CROSS-REFERENCE TO RELATED APPLICATIONS

This application claims the priority benefit of Korean Patent Application No. 10-2012-0117997, filed on Oct. 23, 2012, and Korean Patent Application No. 10-2013-0105538, filed on Sep. 3, 2013, in the Korean Intellectual Property Office, the disclosures of which are incorporated herein by reference.

BACKGROUND

1. Field

The present invention relates to an apparatus and method for calibrating a depth image, and more particularly, to an apparatus and method for calibrating a depth image based on a relationship between a depth sensor and a color camera.

2. Description of Related Art

A depth sensor performing triangulation using a structured light, for example, Microsoft Kinect, may obtain a result including an error when employed by an end user, due to assembly tolerances during production and errors in optical portions.

Also, a geometric relationship between a depth sensor and a camera may need to be obtained when a texture of an object is extracted through simultaneous use of the depth sensor and the camera. When a precise definition of the geometric relationship is absent, an error may occur with respect to texture information associated with an object on which a three-dimensional (3D) reconstruction is to be performed.

A conventional apparatus for calibrating a depth image may obtain a geometric relationship with a color camera, based on a depth image measured by a depth sensor, and thus, a depth image calibrated by the conventional apparatus for calibrating the depth image may include an error due to an error included in the depth sensor.

Accordingly, there is a desire for a method of calibrating an error of a depth sensor, and calibrating a depth image through obtaining a geometric relationship between the depth sensor and a color camera

SUMMARY

An aspect of the present invention provides an apparatus and method for enhancing accuracy of a depth sensor and calibrating a geometric relationship between the depth sensor and a color camera when the depth image is calibrated simultaneously using the depth sensor measuring a distance with an object and the color camera capturing the object.

According to an aspect of the present invention, there is provided an apparatus for calibrating a depth image, the apparatus including a three-dimensional (3D) point determiner to determine a 3D point in a camera image and a 3D point in a depth image simultaneously captured with the camera image, a calibration information determiner to determine calibration information for calibrating an error in the depth image captured by a depth sensor and a geometric relationship between the depth sensor and a color camera, using the 3D point in the camera image and the 3D point in the depth image, and a depth image calibrator to calibrate the depth image based on the calibration information and the 3D point in the depth image.

The 3D point determiner may self-calibrate the camera image, and determine a 3D point of a camera image feature point to be used for self-calibration of the camera image to be the 3D point of the camera image.

The 3D point determiner may extract a depth image feature point corresponding to the camera image feature point from the depth image, and determine the 3D point corresponding to the extracted depth image feature point to be the 3D point of the depth image.

The calibration information determiner may generate Equation 1, Equation 2, and Equation 3, using a 3D point in the camera image and a 3D point in the depth image.

The depth image calibrator may define a cost function of which the calibration information is an initial value, and calibrate an error of a depth sensor and a geometric relationship between the depth sensor and a color camera by performing a non-linear optimum process for minimizing the defined cost function.

According to another aspect of the present invention, there is provided an apparatus for calibrating a depth image, the apparatus including a calibration information determiner to determine calibration information for calibrating an error in the depth image captured by a depth sensor and a geometric relationship between the depth sensor and the color camera, using an equation of a pattern surface restored by the color camera and an equation of a pattern surface restored by the depth sensor, and a depth image calibrator to calibrate the depth image based on the calibration information and a 3D point in the depth image.

The calibration information determiner may generate Equation 7, Equation 8, and Equation 9 based on Equation 5 and Equation 6 when the equation of the pattern surface restored by the color camera corresponds to Equation 5 and the equation of the pattern surface restored by the depth sensor corresponds to Equation 6.

The calibration information determiner may replace, with the calibration information included in Equation 1, Equation 2, and Equation 3, a factor included in an inverse transpose L of a matrix H in which the calibration information is included, and determine relationship information between a coordinate of the depth image and a coordinate of the camera.

According to still another aspect of the present invention, there is provided a method of calibrating a depth image, the method including determining a 3D point in a camera image and a 3D point in a depth image simultaneously captured with the camera image, determining calibration information for calibrating an error in the depth image captured by a depth sensor and a geometric relationship between the depth sensor and a color camera, using the 3D point in the camera image and the 3D point in the depth image, and calibrating the depth image based on the calibration information and the 3D point in the depth image.

According to yet another aspect of the present invention, there is provided a method of calibrating a depth image, the method including determining calibration information for calibrating an error in the depth image captured by a depth sensor and a geometric relationship between the depth sensor and a color camera, using an equation of a pattern surface restored by the depth sensor, and moving the 3D point of the depth image to a coordinate of the camera image based on the calibration information.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
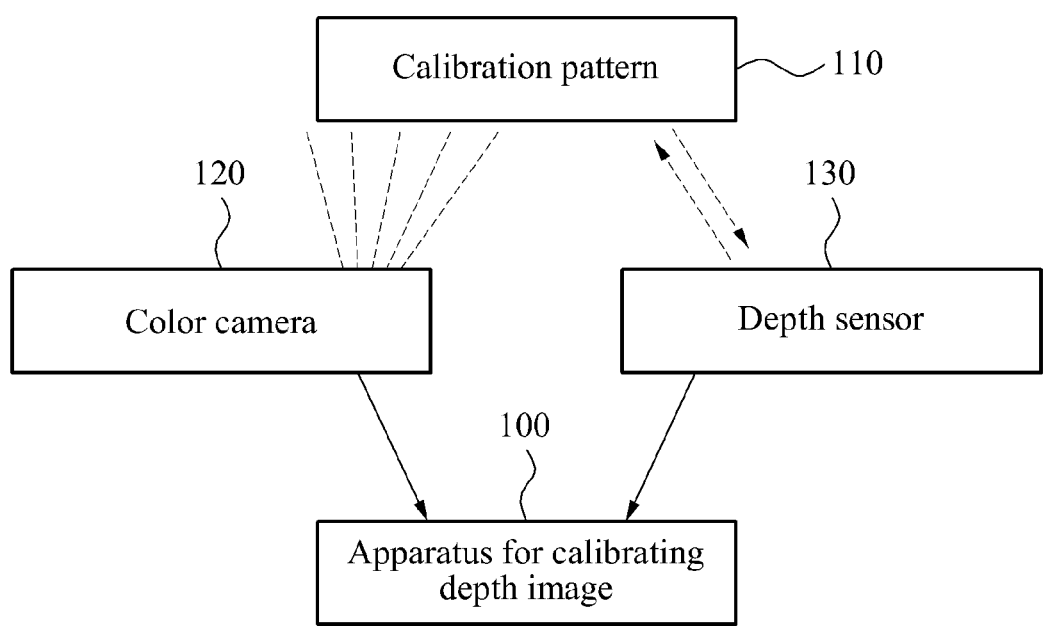
FIG. 1 is a diagram illustrating a relationship between an apparatus for calibrating a depth image and other apparatuses according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a relationship between an apparatus 100 for calibrating a depth image and other apparatuses according to an embodiment of the present invention.

A color camera 120 may capture a calibration pattern 110 and create a camera image in which the calibration pattern 110 is included. In this example, the calibration pattern 110 may correspond to a three-dimensional (3D) object of which a surface is formed by a plurality of signs, such that a geometric relationship between the color camera 120 and a depth sensor 130 may be readily identified.

A form of the calibration pattern 110 will be described in detail with reference to FIG. 2.

Also, the depth sensor 130 may create a depth image by capturing the calibration pattern 110 for simultaneously with the color camera 120. In this instance, the depth sensor 130 may triangulate a distance between the calibration pattern 110 and the depth sensor 130 using a structured light, and create the depth image based on the triangulated distance.

Further, the color camera 120 and the depth sensor 130 may create a plurality of camera images and depth images based on a method of calibrating an image to transmit to the apparatus 100 for calibrating the depth image.

The apparatus 100 for calibrating the depth image may identify the geometric relationship between the color camera 120 and the depth sensor 130 using the depth image received from the depth sensor 130 and the camera image received from the color camera 120, and based on the identified geometric relationship, calibrate the depth image.

Figure 2:
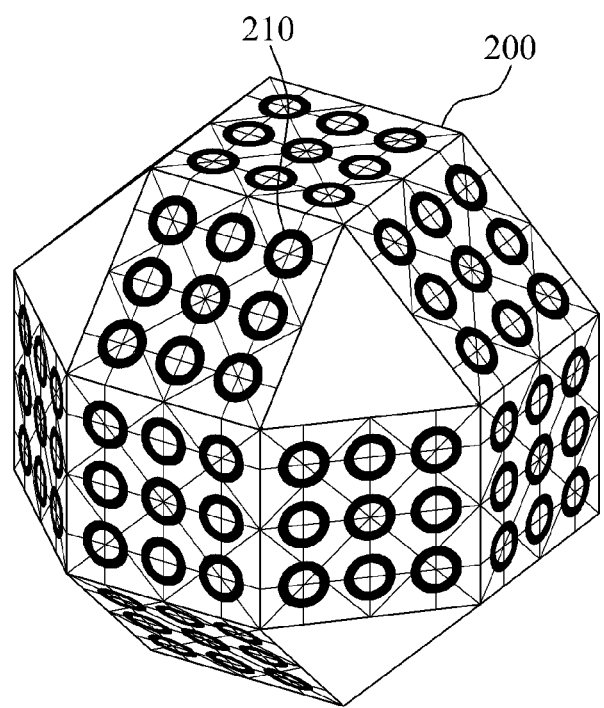
FIG. 2 is a diagram illustrating an example of a calibration pattern according to an embodiment of the present invention.

FIG. 2 is a diagram illustrating an example of the calibration pattern 110 according to an embodiment of the present invention.

The calibration pattern 110 captured by the color camera 120 and the depth sensor 130 may be a polyhedron 200 of which a plurality of facets is a square, and of which the plurality of facets is indicated by a plurality of circles 210.

In this example, the apparatus 100 for calibrating the depth image may match the calibration pattern 110 included in the depth image and the calibration pattern 110 included in the camera image, based on a position of the plurality of circles 210 on the plurality of facets of the calibration pattern 110, and based on a result of the matching, identify a geometric relationship between the color camera 120 and the depth sensor 130.

Figure 3:
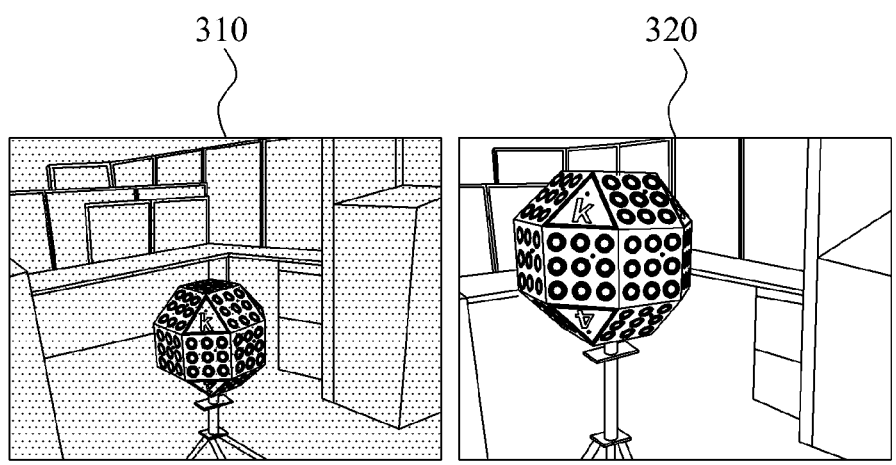
FIG. 3 is a diagram illustrating an example of a depth image and a camera image according to an embodiment of the present invention.

FIG. 3 is a diagram illustrating an example of a depth image 310 and a camera image 320 according to an embodiment of the present invention.

The depth sensor 130 and the color camera 120 may create at least one depth image 310 and at least one camera image 320, based on a method of calibrating an image, respectively, and transmit the created at least one depth image 310 and the at least one camera image 320 to the apparatus 100 for calibrating the depth image.

In this example, the depth image 310 and the camera image 320 may refer to an image created through the depth sensor 130 and the color camera 120 capturing the identical pattern 110 for calibration, respectively. However, the pattern 110 for calibration included in the depth image 310 and the pattern 110 for calibration included in the at least one camera image 320 may differ in terms of a size and an angle, based on the geometric relationship between the color camera 120 and the depth sensor 130 as shown in FIG. 3.

Figure 4:
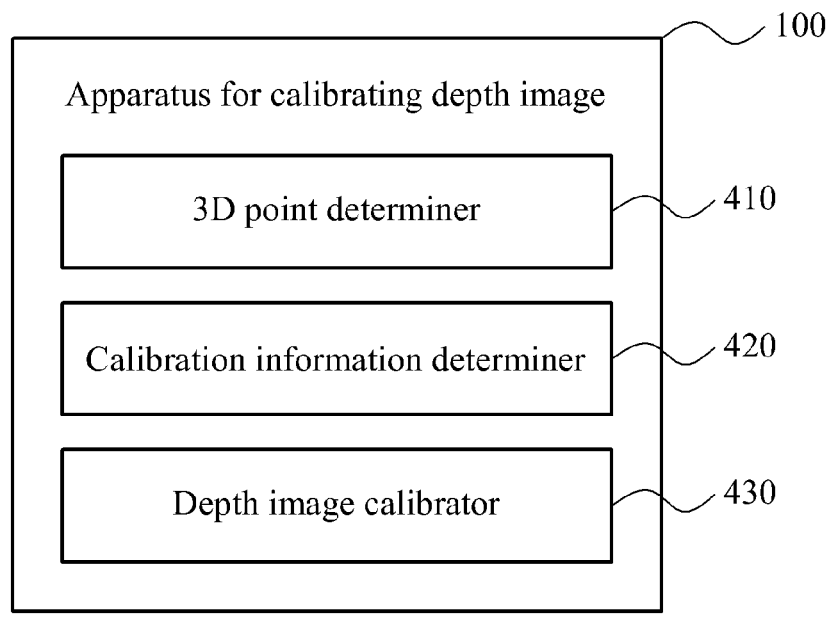
FIG. 4 is a diagram illustrating an apparatus for calibrating a depth image according to an embodiment of the present invention.

FIG. 4 is a diagram illustrating an apparatus 100 for calibrating a depth image according to an embodiment of the present invention.

Referring to FIG. 4, the apparatus 100 for calibrating the depth image may include a 3D point determiner 410, a calibration information determiner 420, and a depth image calibrator 430.

The 3D point determiner 410 may determine a 3D point of a camera image and a 3D point of a depth image simultaneously captured with the camera image.

In FIG. 4, the 3D point determiner 410 may self-calibrate the camera image, and determine a 3D point of a camera image feature point to be used for self-calibrating the camera image to be the 3D point of the camera image. In this example, the 3D point determiner 410 may self-calibrate the camera image through selecting a scheme used in a camera calibration field. Also, the 3D point determiner 410 may define the 3D point of the camera image feature point to be (X, Y, Z).

Additionally, the 3D point determiner 410 may extract a depth image feature point corresponding to the camera image feature point from the depth image, and determine a 3D point corresponding to the extracted depth image feature point to be the 3D point of the depth image. In this instance, the 3D point determiner 410 may define the 3D point of the depth image feature point to be (X', Y', Z').

The calibration information determiner 420 may determine calibration information for calibrating the error of the depth sensor 130 and the geometric relationship between the depth sensor 130 and the color camera 120, using the 3D point of the camera image and the 3D point of the depth image.

For example, the calibration information determiner 420 may generate Equation 1, Equation 2, and Equation 3 simultaneously, using the 3D point of the camera image and the 3D point of the depth image determined by the 3D point determiner 410.

$$X = (X'^{*}H_{11} + Y'^{*}H_{12} + Z'^{*}H_{13} + H_{14}) / (X'^{*}H_{41} + Y'^{*}H_{42} + Z'^{*}H_{43} + H_{44})$$ [Equation 1]

$$Y=(X'^*H_{21}+Y'^*H_{22}+Z'^*H_{23}+H_{24})/(X'^*H_{41}+Y'^*H_{42}+Z'^*H_{43}+H_{44})$$ [Equation 2]

$$Z=(X'^*H_{31}+Y'^*H_{32}+Z'^*H_{33}+H_{34})/(X'^*H_{41}+Y'^*H_{42}+Z'^*H_{43}+H_{44})$$ [Equation 3]

The calibration information determiner 420 may simultaneously generate Equation 1, Equation 2, and Equation 3 with respect to all points corresponding to one another in the camera image and the depth image, and when the generated Equation 1, Equation 2, and Equation 3 are represented in a form of a matrix, a homogeneous equation may be generated as given by Equation 4.

$$Ah=0$$ [Equation 4]

In Equation 4, h denotes a column vector configured by variables ($H_{11}$ $H_{12}$ $H_{13}$ $H_{14}$ $H_{21}$ $H_{22}$ $H_{23}$ $H_{24}$ $H_{31}$ $H_{32}$ $H_{33}$ $H_{34}$ $H_{41}$ $H_{42}$ $H_{43}$ $H_{44}$).

Also, A denotes a 3m×16 matrix configured by 3D points (X, Y, Z) of the camera image feature point and 3D points (X', Y', Z') of the depth image feature point.

Here, m denotes a number of 3D points included in the camera image or the depth image. More particularly, a number of 3D points of the camera image feature point included in the camera image and a number of 3D points of the depth image feature point included in the depth image may be identical to one another because the 3D point of the depth image feature point may be determined by the depth image feature point corresponding to the camera image feature point. Accordingly, the calibration information determiner 420 may select one of the number of the 3D points included in the camera image and the number of the 3D points included in the depth image to set the selected number to be m.

The calibration information determiner 420 may calculate values of variables included in h based on Equation 4, and determine the calculated values of variables to be calibration information.

Also, the calibration information determiner 420 may determine the calibration information for calibrating the error of the depth image captured by the depth sensor 130 and the geometric relationship between the depth sensor 130 and the color camera 120, using an equation of a pattern surface restored by the color camera 120 and an equation of a pattern surface restored by the depth sensor 130.

For example, the equation of the pattern surface restored by the color camera 120 may correspond to Equation 5, and the equation of the pattern surface restored by the depth sensor 130 may correspond to Equation 6.

$$aX+bY+cZ+1=0$$ [Equation 5]

$$a'X+b'Y+c'Z+1=0$$ [Equation 6]

In this example, the calibration information determiner 420 may generate Equation 7, Equation 8, and Equation 9 based on Equation 1, Equation 2, and Equation 3. In particular, the calibration information determiner 420 may change (X, Y, Z) of Equation 1, Equation 2, and Equation 3 to (a, b, c), and change (X', Y', Z') to (a', b', c') so as to generate Equation 7, Equation 8, and Equation 9.

$$a=(a'^*H_{11}+b'^*H_{12}+c'^*H_{13}+H_{14})/(a'^*H_{41}+b'^*H_{42}+c'^*H_{43}+H_{44})$$ [Equation 7]

$$b=(a'^*H_{21}+b'^*H_{22}+c'^*H_{23}+H_{24})/(a'^*H_{41}+b'^*H_{42}+c'^*H_{43}+H_{44})$$ [Equation 8]

$$c=(a'^*H_{31}+b'^*H_{32}+c'^*H_{33}+H_{34})/(a'^*H_{41}+b'^*H_{42}+c'^*H_{43}+H_{44})$$ [Equation 9]

Also, the calibration information determiner 420 may generate a homogeneous equation as Equation 10 by representing Equation 7, Equation 8, and Equation 9 in a form of a matrix.

$$Bh=0$$ [Equation 10]

where h denotes a column vector configured by variables ($H_{11}$ $H_{12}$ $H_{13}$ $H_{14}$ $H_{21}$ $H_{22}$ $H_{23}$ $H_{24}$ $H_{31}$ $H_{32}$ $H_{33}$ $H_{34}$ $H_{41}$ $H_{42}$ $H_{43}$ $H_{44}$).

Additionally, B denotes a 3m×16 matrix configured by (a, b, c) of Equation 5 and (a', b', c') of Equation 6.

Here, m denotes a number of pattern surfaces restored in the camera image or the depth image. More particularly, a number of the pattern surfaces restored included in the camera image and a number of the pattern surfaces restored included in the depth image may be identical to one another because the pattern surfaces restored in the depth image may be determined by the pattern surfaces restored in the depth image corresponding to the pattern surfaces restored in the camera image. Accordingly, the calibration information determiner 420 may select one of the number of the pattern surfaces restored included in the camera image and the number of the pattern surfaces restored included in the depth image to set the selected number to be m.

Also, the calibration information determiner 420 may obtain a matrix H of Equation 11 using h of Equation 10.

$$H = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix}$$ [Equation 11]

Further, the calibration information determiner 420 may calculate values of variables included in the matrix H based on Equation 10, and determine the calculated values of variables to be the calibration information. In this instance, the variables ($H_{11}$ $H_{12}$ $H_{13}$ $H_{14}$ $H_{21}$ $H_{22}$ $H_{23}$ $H_{24}$ $H_{31}$ $H_{32}$ $H_{33}$ $H_{34}$ $H_{41}$ $H_{42}$ $H_{43}$ $H_{44}$) included in the matrix H may correspond to variables included in h of Equation 10. In particular, the calibration information determiner 420 may convert a column vector h into a form of the matrix H, and determine the converted matrix H to be the calibration information.

In this example, the calibration information determiner 420 may replace, with the calibration information included in Equation 1, Equation 2, and Equation 3, a factor included in an inverse transpose L of the matrix H, and determine relationship information between a coordinate of the depth image and a coordinate of the camera image. By way of example, the calibration information determiner 420 may determine the matrix L based on Equation 12.

$$L=H^{-T}$$ [Equation 12]

More particularly, the calibration information determiner 420 may determine relationship information indicating a conversion relationship with respect to points (X', Y', Z') and points (X, Y, Z) using a factor $L_{ij}$ of the matrix L in lieu of the camera image and $H_{ij}$.

The depth image calibrator 430 may calibrate the depth image based on the 3D point included in the depth image and the calibration information determined by the calibration information determiner 420.

For example, when the 3D points included in the depth image correspond to (X', Y', Z'), the depth image calibrator 430 may substitute (X', Y', Z') and the calibration information ($H_{11}$ $H_{12}$ $H_{13}$ $H_{14}$ $H_{21}$ $H_{22}$ $H_{23}$ $H_{24}$ $H_{31}$ $H_{32}$ $H_{33}$ $H_{34}$ $H_{41}$ $H_{42}$ $H_{43}$ $H_{44}$) into Equation 1, Equation 2, and Equation 3 to determine the 3D points (X, Y, Z).

In this example, the 3D points (X, Y, Z) determined by the depth image calibrator 430 may refer to a value obtained by moving the 3D point included in the depth image to a camera coordinate while calibrating an error due to the geometric relationship between the color camera 120 and the depth sensor 130.

In particular, the depth image calibrator 430 may determine the 3D points (X, Y, Z), and calibrate based on the geometric relationship between the color camera 120 and the depth sensor 130.

Also, the depth image calibrator 430 may define a cost function of which the calibration information h is an initial value, and more precisely calibrate the error of the depth sensor 130 and the geometric relationship between the depth sensor 130 and the color camera 120 by performing a non-linear optimum process for minimizing the defined cost function.

For one example, the depth image calibrator 430 may define a cost function as simplified to Equation 13.

$$\sum_{s=1}^{m} \|P - P''\|^2 \quad \text{[Equation 13]}$$

In Equation 13, P=(X, Y, Z) and P''=(X'', Y'', Z''). Also, (X'', Y'', Z'') may be a result of substituting (X', Y', Z') into Equation 1, Equation 2, and Equation 3.

Figure 5:
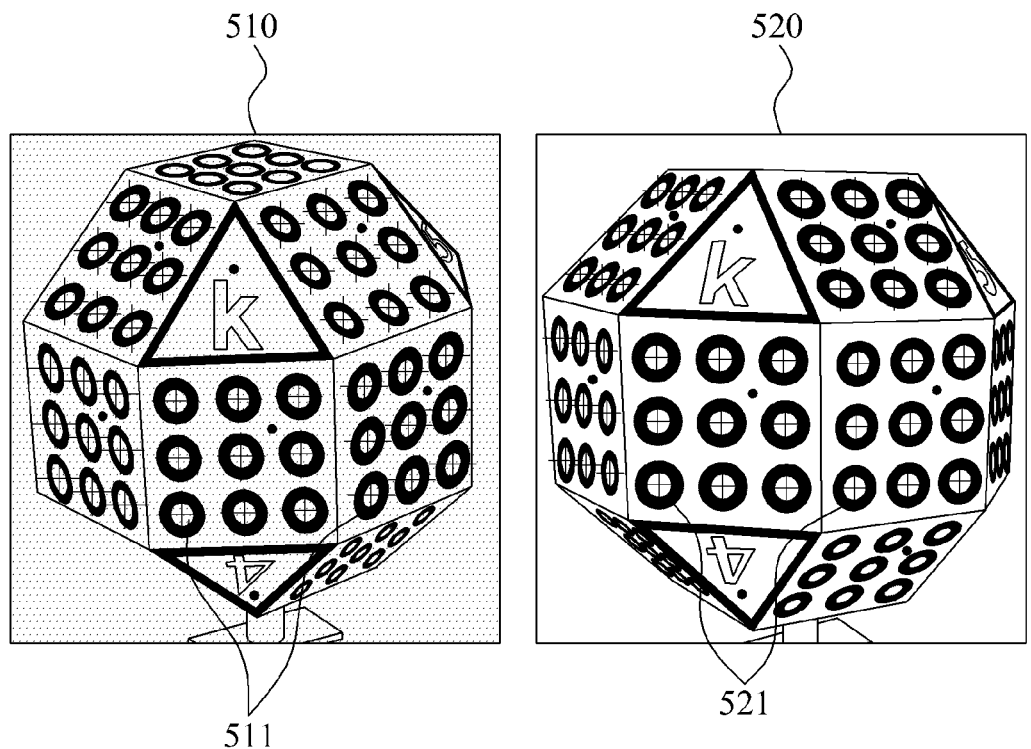
FIG. 5 is a diagram illustrating an example of a process in which an apparatus for calibrating a depth image matches a depth image feature point to a camera image feature point according to an embodiment of the present invention.

FIG. 5 is a diagram illustrating an example of a process in which an apparatus for calibrating a depth image matches a depth image feature point 511 and a camera image feature point 521 according to an embodiment of the present invention.

The 3D point determiner 410 may self-calibrate a camera image 520, and determine a 3D point of the camera image feature point 521 to be used for self-calibration of the camera image 520 to be a 3D point of the camera image 520.

Also, the 3D point determiner 410 may extract the depth image feature point 511 corresponding to the camera image feature point 521 from a depth image 510, and determine a 3D point corresponding to the extracted depth image feature point 511 to be a 3D point of the depth image 510.

Figure 6:
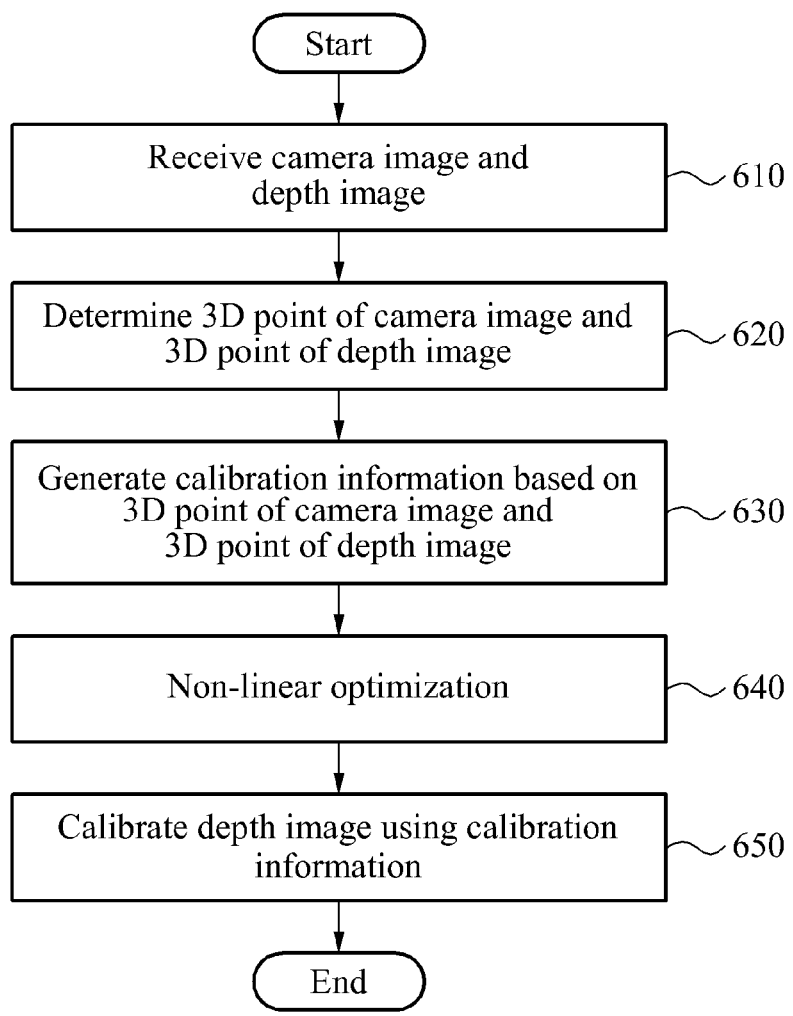
FIG. 6 is a flowchart illustrating a method of calibrating an image according to an embodiment of the present invention.

FIG. 6 is a flowchart illustrating a method of calibrating an image according to an embodiment of the present invention.

In particular, FIG. 6 illustrates a method of calibrating an image using a 3D point.

In 610, the 3D point determiner 410 may receive a camera image and a depth image simultaneously captured by the color camera 120 and the depth sensor 130.

In 620, the 3D point determiner 410 may determine a 3D point of the camera image received in 610 and a 3D point of the depth image received in 610.

More particularly, the 3D point determiner 410 may self-calibrate the camera image, and determine a 3D point of a camera image feature point to be used for the self-calibration of the camera image to be the 3D point of the camera image. Subsequently, the 3D point determiner 410 may extract a depth image feature point corresponding to the camera image feature point from the depth image, and determine a 3D point corresponding to the extracted depth image feature point to be a 3D point of the depth image.

In 630, the calibration information determiner 420 may determine calibration information for calibrating an error of the depth sensor 130 and a geometric relationship between the depth sensor 130 and a color camera, using the 3D point of the camera image and the 3D point of the depth image determined in 620.

For example, the calibration information determiner 420 may generate Equation 1, Equation 2, and Equation 3, using the 3D point of the camera image and the 3D point of the depth image determined by the 3D point determiner 410. In particular, the calibration information determiner 420 may generate Equation 1, Equation 2, and Equation 3 with respect to all points corresponding to one another in the camera image and the depth image, and when the generated Equation 1, Equation 2, and Equation 3 are represented in a form of a matrix, a homogeneous equation may be generated as given by Equation 4. In addition, the calibration information determiner 420 may calculate values of variables included in h based on Equation 4, and determine the calculated values of variables to be calibration information.

Also, the calibration information determiner 420 may replace, with the calibration information included in Equation 1, Equation 2, and Equation 3, a factor included in the inverse transpose L of the matrix H including the calibration information, and determine relationship information between a coordinate of the depth image and a coordinate of the camera image.

In 640, the depth image calibrator 430 may define a cost function of which the calibration information h is an initial value, and perform a non-linear optimum process for minimizing the defined cost function. 650 may be performed when the camera image is to be calibrated thoroughly, and based on a degree of the calibration of the camera image, 650 may be omitted.

In 650, the depth image calibrator 430 may calibrate the depth image based on the 3D point included in the depth image and the calibration information determined by the calibration information determiner 420 in 630.

For one example, when 3D points included in the depth image correspond to (X', Y', Z'), the depth image calibrator 430 may substitute (X', Y', Z') and calibration information ($H_{11}$ $H_{12}$ $H_{13}$ $H_{14}$ $H_{21}$ $H_{22}$ $H_{23}$ $H_{24}$ $H_{31}$ $H_{32}$ $H_{33}$ $H_{34}$ $H_{41}$ $H_{42}$ $H_{43}$ $H_{44}$) into Equation 1 through Equation 3, and determine 3D points (X, Y, Z).

Also, the depth image calibrator 430 may calibrate the depth image based on the 3D points included in the depth image and the cost function minimized in 650.

Figure 7:
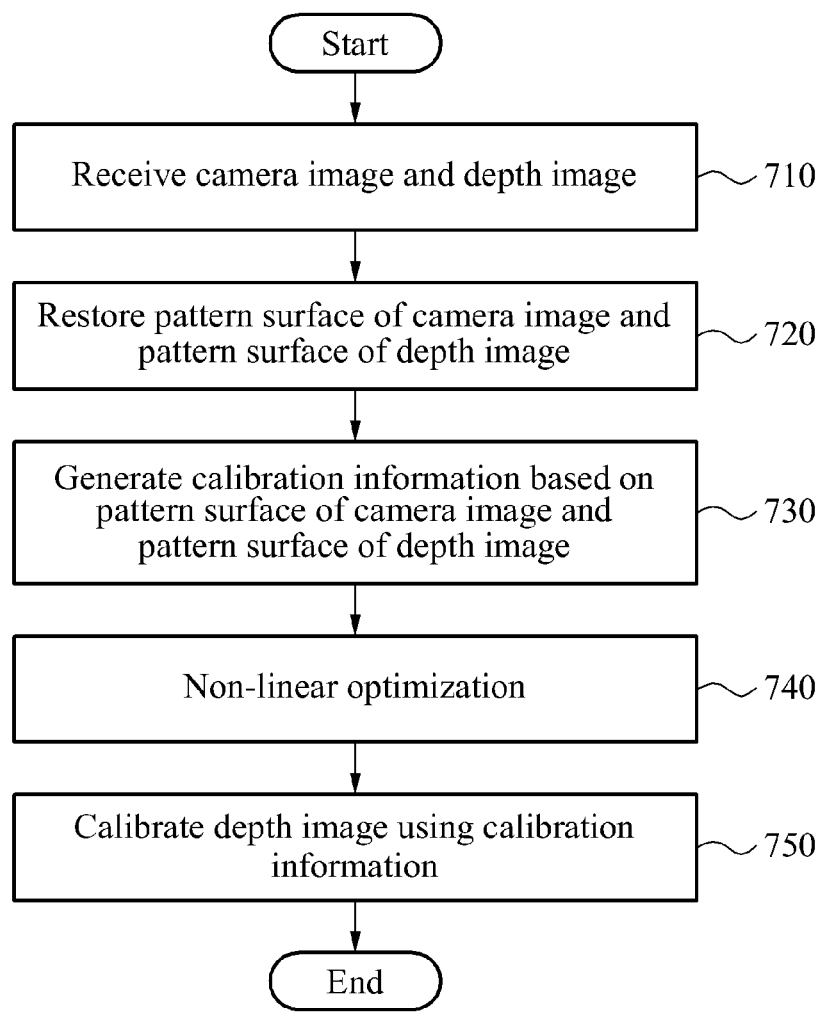
FIG. 7 is a flowchart illustrating another example of a method of calibrating an image according to an embodiment of the present invention.

FIG. 7 is a flowchart illustrating another example of a method of calibrating an image according to an embodiment of the present invention.

In particular, FIG. 7 illustrates a method of calibrating an image using an equation of a pattern surface.

In 710, the 3D point determiner 410 may receive a camera image and a depth image simultaneously captured by the color camera 120 and the depth sensor 130.

In 720, the 3D point determiner 410 may restore the equation of the pattern surface of the pattern 110 for calibration in the camera image received in 710. Also, the 3D point determiner 410 may restore the equation of the pattern surface of the pattern 110 for calibration in the depth image received in 710.

In 730, the calibration information determiner 420 may determine calibration information for calibrating the error of the depth image captured by the depth sensor 130 and the geometric relationship between the depth sensor 130 and the color camera 120, using the equation of the pattern surface of the camera image and the equation of the pattern surface of the depth image restored in 720.

In this instance, the calibration information determiner 420 may generate Equation 7, Equation 8, and Equation 9 based on Equation 1, Equation 2, and Equation 3. More particularly, the calibration information determiner 420 may change (X, Y, Z) of Equation 1, Equation 2, and Equation 3 to (a, b, c), and change (X', Y', Z') to (a', b', c') so as to generate Equation 7, Equation 8, and Equation 9.

Also, the calibration information determiner 420 may represent Equation 7, Equation 8, and Equation 9 in a form of a matrix to generate a homogeneous equation such as Equation 10.

Additionally, the calibration information determiner 420 may calculate values of variables included in h based on Equation 10, and determine the calculated values of variables to be calibration information.

Further, the calibration information determiner 420 may replace, with the calibration information included in Equation 1, Equation 2, and Equation 3, a factor included in an inverse transpose L of a matrix H in which the calibration information is included, and determine relationship information between a coordinate of the depth image and a coordinate of the camera image.

In 740, the depth image calibrator 430 may define a cost function of which the calibration information h is an initial value, and perform a non-linear optimum process for minimizing the defined cost function. 750 may be performed when the camera image is to be calibrated thoroughly, and based on a degree of the calibration of the camera image, 750 may be omitted.

In 750, the depth image calibrator 430 may calibrate the depth image based on the 3D point included in the depth image and the calibration information determined by the calibration information determiner 420 in 730.

Also, the depth image calibrator 430 may calibrate the depth image based on the 3D point included in the depth image and the cost function minimized in 750.

According to an exemplary embodiment of the present invention, it is possible to obtain a detailed depth image through calibrating an error of the depth image captured by a depth sensor and a geometric relationship between the depth sensor and a color camera, using a 3D point in a camera image and a 3D point in a depth image captured simultaneously with the camera image.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for calibrating a depth image, the apparatus comprising:
a processor comprising:
a three-dimensional (3D) point determiner to determine a 3D point in a camera image and a 3D point in a depth image that are simultaneously captured with the camera image;
a calibration information determiner to determine calibration information for calibrating an error in the depth image captured by a depth sensor and a geometric relationship between the depth sensor and a color camera, using the 3D point in the camera image and the 3D point in the depth image; and
a depth image calibrator to calibrate the depth image based on the calibration information and the 3D point in the depth image,
wherein the depth image calibrator defines a cost function of which the calibration information is an initial value, and calibrates an error of a depth sensor and a geometric relationship between the depth sensor and a color camera by performing a non-linear optimum process for minimizing the defined cost function.

2. The apparatus of claim 1, wherein the 3D point determiner extracts a depth image feature point corresponding to a camera image feature point to be used for self-calibrating the camera image in the depth image, and determines a 3D point corresponding to the extracted depth image feature point to be a 3D point in the depth image.

3. The apparatus of claim 1, wherein the calibration information determiner generates Equation 1, Equation 2, and Equation 3, using a 3D point in the camera image and a 3D point in the depth image, in which $$X=(X'*H_{11}+Y'*H_{12}+Z'*H_{13}+H_{14})/(X'*H_{41}+Y'*H_{42}+Z'*H_{43}+H_{44})$$ [Equation 1]

$$Y=(X'*H_{21}+Y'*H_{22}+Z'*H_{23}+H_{24})/(X'*H_{41}+Y'*H_{42}+Z'*H_{43}+H_{44})$$ [Equation 2]

$$Z=(X'*H_{31}+Y'*H_{32}+Z'*H_{33}+H_{34})/(X'*H_{41}+Y'*H_{42}+Z'*H_{43}+H_{44})$$ [Equation 3]

wherein X, Y, and Z denote coordinates of the 3D point in the camera image, X', Y', and Z' denote coordinates of the 3D point in the depth image, and ($H_{11}$ $H_{12}$ $H_{13}$ $H_{14}$ $H_{21}$ $H_{22}$ $H_{23}$ $H_{24}$ $H_{31}$ $H_{32}$ $H_{33}$ $H_{34}$ $H_{41}$ $H_{42}$ $H_{43}$ $H_{44}$) denotes calibration information.

4. The apparatus of claim 1, wherein the calibration information determiner generates Equation 4 using the 3D point in the camera image and the 3D point in the depth image, and determines calibration information using Equation 4

$$Ah=0, \text{wherein}$$ [Equation 4]

A denotes a 3m×16 matrix configured by coordinates of the 3D point in the camera image and the 3D point in the depth image, h denotes calibration information, and m denotes a number of 3D points included in the camera image or the depth image.

5. An apparatus for calibrating a depth image, the apparatus comprising:
a processor comprising:
a calibration information determiner to determine calibration information for calibrating an error in the depth image captured by a depth sensor and a geometric relationship between the depth sensor and a color camera, using an equation of a pattern surface restored by the color camera and an equation of a pattern surface restored by the depth sensor; and a depth image calibrator to calibrate the depth image based on the calibration information and a three-dimensional (3D) point in the depth image.

6. The apparatus of claim 5, wherein the calibration information determiner generates Equation 7, Equation 8, and Equation 9 based on Equation 5 and Equation 6 when the equation of the pattern surface restored by the color camera corresponds to Equation 5 and the equation of the pattern surface restored by the depth sensor corresponds to Equation 6, in which $$aX+bY+cZ+1=0 \quad \text{[Equation 5]}$$

$$a'X+b'Y+c'Z+1=0 \quad \text{[Equation 6]}$$

$$a=(a'^*H_{11}+b'^*H_{12}+c'^*H_{13}+H_{14})/(a'^*H_{41}+b'^*H_{42}+c'^*H_{43}+H_{44}) \quad \text{[Equation 7]}$$

$$b=(a'^*H_{21}+b'^*H_{22}+c'^*H_{23}+H_{24})/(a'^*H_{41}+b'^*H_{42}+c'^*H_{43}+H_{44}) \quad \text{[Equation 8]}$$

$$c=(a'^*H_{31}+b'^*H_{32}+c'^*H_{33}+H_{34})/(a'^*H_{41}+b'^*H_{42}+c'^*H_{43}+H_{44}), \text{ wherein} \quad \text{[Equation 9]}$$

$(H_{11} H_{12} H_{13} H_{14} H_{21} H_{22} H_{23} H_{24} H_{31} H_{32} H_{33} H_{34} H_{41} H_{42} H_{43} H_{44})$ denotes calibration information.

7. The apparatus of claim 6, wherein the calibration information determiner replaces, with the calibration information included in Equation 1, Equation 2, and Equation 3, a factor included in an inverse transpose L of a matrix H in which the calibration information is included, and determines relationship information between a coordinate of the depth image and a coordinate of the camera.

8. The apparatus of claim 5, wherein the depth image calibrator moves the 3D point in the depth image to a coordinate of the camera image based on the calibration information.

9. A method of calibrating a depth image, the method comprising:
determining a three-dimensional (3D) point in a camera image and a 3D point in a depth image that are simultaneously captured with the camera image;
determining calibration information for calibrating an error in the depth image captured by a depth sensor and a geometric relationship between the depth sensor and a color camera, using the 3D point in the camera image and the 3D point in the depth image; and
calibrating the depth image based on the calibration information and the 3D point in the depth image,
wherein the calibrating of the depth image comprises:
defining a cost function of which the calibration information is an initial value, and calibrating a depth image by performing a non-linear optimum process for minimizing the defined cost function.

10. The method of claim 9, wherein the determining of the 3D point comprises:
extracting a depth image feature point corresponding to a camera image feature point to be used for self-calibrating the camera image from the depth image, and determining the 3D point corresponding to the extracted depth image feature point to be the 3D point in the depth image.

11. The method of claim 9, wherein the determining of the calibration information comprises:
generating Equation 1, Equation 2, and Equation 3, using the 3D point in the camera image and the 3D point in the depth image, in which $$X=(X'^*H_{11}+Y'^*H_{12}+Z'^*H_{13}+H_{14})/(X'^*H_{41}+Y'^*H_{42}+Z'^*H_{43}+H_{44}) \quad \text{[Equation 1]}$$

$$Y=(X'^*H_{21}+Y'^*H_{22}+Z'^*H_{23}+H_{24})/(X'^*H_{41}+Y'^*H_{42}+Z'^*H_{43}+H_{44}) \quad \text{[Equation 2]}$$

$$Z=(X'^*H_{31}+Y'^*H_{32}+Z'^*H_{33}+H_{34})/(X'^*H_{41}+Y'^*H_{42}+Z'^*H_{43}+H_{44}), \text{ wherein} \quad \text{[Equation 3]}$$

X, Y, and Z denote coordinates of the 3D point in the camera image, X', Y', and Z' denote coordinates of the 3D point in the depth image, and $(H_{11} H_{12} H_{13} H_{14} H_{21} H_{22} H_{23} H_{24} H_{31} H_{32} H_{33} H_{34} H_{41} H_{42} H_{43} H_{44})$ denotes calibration information.

12. The method of claim 9, wherein the determining of the calibration information comprises:
generating Equation 4 using the 3D point in the camera image and the 3D point in the depth image, and determining the calibration information using Equation 4, in which $$Ah=0, \text{ wherein} \quad \text{[Equation 4]}$$

A denotes a 3m×16 matrix configured by coordinates of the 3D point in the camera image and the 3D point in the depth image, h denotes calibration information, and m denotes a number of 3D points included in the camera image or the depth image.

13. The method of claim 9, wherein the calibrating of the depth image comprises:
moving the 3D point in the depth image to a coordinate of a camera image based on the calibration information.

14. A method of calibrating a depth image, the method comprising:
determining calibration information for calibrating an error in the depth image captured by a depth sensor and a geometric relationship between the depth sensor and a color camera, using an equation of a pattern surface restored by the depth sensor; and
calibrating the depth image based on the calibration information and a three-dimensional (3D) point in the depth image.

15. The method of claim 14, wherein the determining of the calibration information comprises:
generating Equation 7, Equation 8, and Equation 9 based on Equation 5 and Equation 6 when an equation of a pattern surface restored by the color camera corresponds to Equation 5 and an equation of a pattern surface restored by the depth sensor corresponds to Equation 6, in which $$aX+bY+cZ+1=0 \quad \text{[Equation 5]}$$

$$a'X+b'Y+c'Z+1=0 \quad \text{[Equation 6]}$$

$$a=(a'^*H_{11}+b'^*H_{12}+c'^*H_{13}+H_{14})/(a'^*H_{41}+b'^*H_{42}+c'^*H_{43}+H_{44}) \quad \text{[Equation 7]}$$

$$b=(a'^*H_{21}+b'^*H_{22}+c'^*H_{23}+H_{24})/(a'^*H_{41}+b'^*H_{42}+c'^*H_{43}+H_{44}) \quad \text{[Equation 8]}$$

$$c=(a'^*H_{31}+b'^*H_{32}+c'^*H_{33}+H_{34})/(a'^*H_{41}+b'^*H_{42}+c'^*H_{43}+H_{44}), \text{ wherein} \quad \text{[Equation 9]}$$

$(H_{11} H_{12} H_{13} H_{14} H_{21} H_{22} H_{23} H_{24} H_{31} H_{32} H_{33} H_{34} H_{41} H_{42} H_{43} H_{44})$ denotes calibration information.

16. The method of claim 15, wherein the determining of the calibration information comprises:
replacing, with the calibration information included in Equation 1, Equation 2, and Equation 3, a factor included in an inverse transpose L of a matrix H in which the calibration information is included, and determining relationship information between a coordinate of the depth image and a coordinate of the camera image.

\* \* \* \* \*